United States Patent
Begen et al.

(10) Patent No.: US 10,623,785 B2
(45) Date of Patent: *Apr. 14, 2020

(54) STREAMING MANIFEST QUALITY CONTROL

(71) Applicant: Cisco Technology, Inc., San Jose, CA (US)

(72) Inventors: Ali C. Begen, London (CA); David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,500

(22) Filed: Dec. 1, 2017

(65) Prior Publication Data

US 2018/0091572 A1   Mar. 29, 2018

Related U.S. Application Data

(60) Division of application No. 14/568,355, filed on Dec. 12, 2014, now Pat. No. 9,866,605, which is a continuation of application No. 13/208,981, filed on Aug. 12, 2011, now Pat. No. 8,924,580.

(51) Int. Cl.
| | |
|---|---|
| *G06F 15/16* | (2006.01) |
| *H04N 21/2343* | (2011.01) |
| *B63B 15/00* | (2006.01) |
| *B63H 9/04* | (2020.01) |
| *G09B 9/06* | (2006.01) |

(52) U.S. Cl.
CPC ... *H04N 21/23439* (2013.01); *B63B 15/0083* (2013.01); *B63H 9/04* (2013.01); *G09B 9/066* (2013.01)

(58) Field of Classification Search
USPC .................................................. 709/219, 231
See application file for complete search history.

(56) References Cited

U.S. PATENT DOCUMENTS

| | | | |
|---|---|---|---|
| 9,866,605 B2 | 1/2018 | Begen et al. | |
| 2007/0002946 A1 | 1/2007 | Bouton et al. | |
| 2008/0037624 A1 | 2/2008 | Walker et al. | |
| 2008/0260042 A1 | 10/2008 | Shah et al. | |
| 2010/0235472 A1 | 9/2010 | Sood et al. | |
| 2012/0203868 A1* | 8/2012 | Myers | H04N 21/234327 709/219 |
| 2012/0209952 A1 | 8/2012 | Lotfallah et al. | |
| 2014/0201324 A1* | 7/2014 | Zhang | H04L 65/4084 709/217 |
| 2015/0100703 A1 | 4/2015 | Begen et al. | |

FOREIGN PATENT DOCUMENTS

CN   102710586 B   * 10/2014

* cited by examiner

*Primary Examiner* — Hee Soo Kim
(74) *Attorney, Agent, or Firm* — Merchant & Gould P.C.

(57) ABSTRACT

In one embodiment, a method that receives a manifest for plural encoded representations of a single content stream, each representation fragmented into plural chunks, each representation comprising a different quality level, the manifest listing a plurality of representations, each representation comprising the plural chunks at one of a plurality of quality levels, and requests one of the plural chunks based on selection of one of the plurality of quality levels explicitly indicated in the manifest.

20 Claims, 6 Drawing Sheets

STREAMING MANIFEST QUALITY CONTROL

RELATED APPLICATIONS

This application is a division of U.S. application Ser. No. 14/568,355 filed Dec. 12, 2014 (now U.S. Pat. No. 9,866,605), which is a continuation of U.S. application Ser. No. 13/208,981 filed Aug. 12, 2011, which issued on Dec. 30, 2014 as U.S. Pat. No. 8,924,580, both of which are entirely incorporated herein by reference.

TECHNICAL FIELD

The present disclosure is generally related to adaptive streaming in computer networks.

BACKGROUND

Transmission of media content (e.g., video, audio, and/or data, etc., collectively or individually referred to herein also as content) between different nodes on a network may be performed in a variety of ways. The type of content that is the subject of the transfer and the underlying network conditions usually determine the methods used for communication. For instance, for a simple file transfer over a lossy network, one emphasis is on reliable delivery. The packets may be protected against losses with added redundancy or the lost packets may be recovered by retransmissions. In the case of audio/video content delivery with real-time viewing requirements, one emphasis is on low latency and efficient transmission to enable the best possible viewing experience, where occasional losses may be tolerated.

The structure of the packets and the algorithms used for real-time content transmission on a given network may collectively define a chosen content streaming protocol. Although various content streaming protocols available today differ in implementation details, they can generally be classified into two main categories: push-based protocols and pull-based protocols. In push-based streaming protocols, once a connection is established between a server (e.g., server device or server software) and a client (e.g., client device or client software), the server remains active on the session and streams packets to the client until the session is torn down or interrupted for example by a client pausing or skipping in the content. In pull-based streaming protocols, the client is the active entity that requests the content from the server. Thus, the server response depends on the client request, where otherwise the server is idle or blocked for that client. Further, the bitrate at which the client wishes to receive the content is determined entirely by the client. The actual rate of reception depends upon the client's capabilities, the load on the server, and the available network bandwidth. As the primary download protocol of the Internet, HTTP is a common communication protocol upon which pull-based content delivery is based.

In pull-based adaptive streaming, the client makes a decision about which specific representation of any given content it will request next from a server, where each representation may be received at the client in the form of a plurality of requested segments or chunks (e.g., 2-10 seconds in duration, such as a plurality of video frames of a given scene). Such a decision may be based on various parameters and/or observations, including the current (observed/available) bandwidth and the amount of data currently residing in a client buffer. Throughout the duration of a given viewing experience, the client may upshift or downshift (e.g., switch to a representation using a higher or lower bitrate) or stay at the same bitrate based on the available bandwidth and buffer conditions, among other factors. As a result of the bitrate transitions, encoded video quality as seen by the client's decoder may change considerably, most notably with scenes of high motion compared to more static scenes (e.g., in constant bitrate implementations). Even in variable bitrate encoding schemes, despite an advertised (e.g., via a manifest) long-term average encoding bitrate, each of the chunks of a given representation may vary considerably in bitrate. In other words, while the long-term average quality and bitrate behave as conjugate variables, over the temporal chunking intervals (as used in adaptive streaming), quality and bitrate may diverge significantly.

Adaptive streaming (e.g., adaptive video streaming) generally structures a content stream as a multi-dimensional array of content chunks (e.g., piece of content, where a chunk may be one or more Groups of Pictures (GoP) as known in MPEG-compatible systems, or a "fragment" in MPEG-4 (MP4) systems, or other suitable sub-divisions of an entire instance of content, also can be called a fragment or a segment). A chunk represents temporal slices of the content (e.g., 2-10 seconds in duration), which has been encoded or otherwise processed to produce differing levels of quality, different resolutions, etc., and in particular, has different sizes requiring different amounts of bandwidth to deliver to one or more client devices. Virtually all current adaptive streaming systems today use a two-dimensional matrix, with one dimension consisting of the time, and the other dimension consisting of (target) encoding rate. In addition, current adaptive streaming systems use a variety of storage structures for the content, such as directories with individual files for each chunk, fragmented MP4 files (e.g., a standardized file format), or custom packaging schemes. The structure of the content matrix, along with associated metadata describing each chunk, is contained in a separate structure, generally referred to as a manifest. The manifests are typically divided into representations each of which describes one row of the content matrix (e.g., all the chunks encoded at a bitrate X). There exist various schemes and emerging standards for the manifests.

Continuing the overview, during the bitrate transitions, the encoding quality may change. In particular, if an encoder adopts a constant bitrate (CBR)-based encoding scheme to exactly match the advertised (e.g., via the manifest) bitrates for each representation, the quality may vary widely over time within each representation. When the client stays at the same bitrate, the quality may vary from a high-motion or high-complexity scene to a low-motion or low-complexity scene.

In variable bitrate (VBR) encoding schemes, the bitrate is allowed to vary in the short term to keep quality close to constant. The representation bitrate in VBR systems consists of longer-term, average encoding bitrates. For example, at a 1 Mbps representation, some of the chunks may be encoded at 500 Kbps, whereas some of the chunks may be encoded at 1.5 Mbps and these chunks might have a comparable quality level. In such VBR systems, large bitrate variations among the chunks belonging to a given representation are observed. However, schemes to address quality fluctuations in the context of representation changes (e.g., upshifts and downshifts) are not presently known.

Accordingly, certain embodiments of adaptive streaming systems address these and/or other issues.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
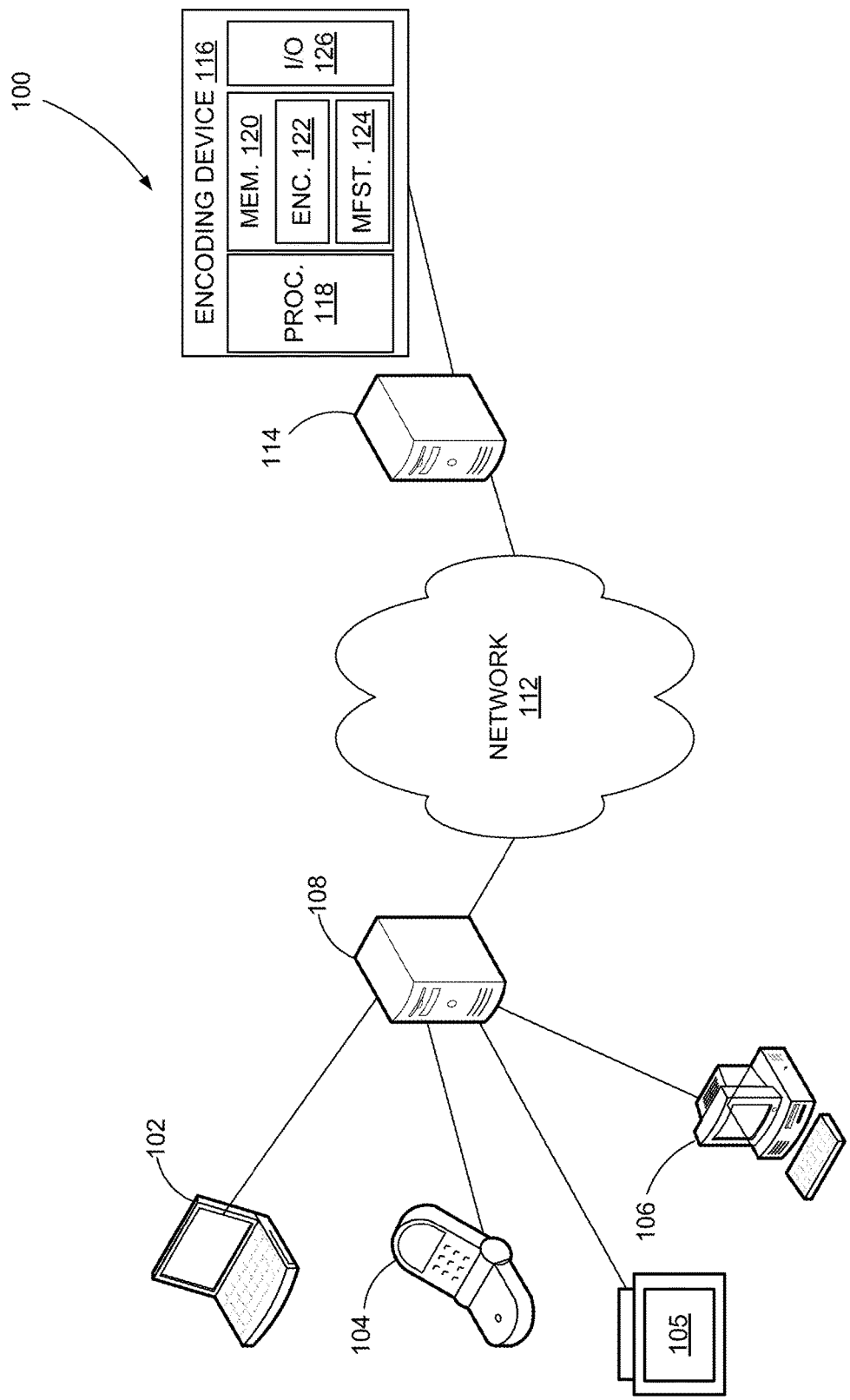
FIG. 1 is a block diagram that illustrates an example environment in which adaptive streaming systems and methods may be implemented.

In one embodiment, a method that receives a manifest for plural encoded representations of a single content stream, each representation fragmented into plural chunks, each representation comprising a different quality level, the manifest listing a plurality of representations, each representation comprising the plural chunks at one of a plurality of quality levels, and requests one of the plural chunks based on selection of one of the plurality of quality levels explicitly indicated in the manifest.

Example Embodiments

Disclosed herein are various embodiments of adaptive streaming systems and methods that use constant quality, or near constant quality, chunks to provide a better viewing experience, even during upshifts and downshifts in adaptive streaming. In described embodiments, a client device may directly track and optimize quality by choosing constant quality chunks such that the client device: (a) receives the highest quality representation within an available bandwidth, (b) upshifts to a higher quality representation when bandwidth is available (rather than upshifting to a higher bitrate even though quality may not be improved), (c) downshifts to a lower quality when bandwidth is scarce, and/or (d) maintains a smooth quality over time while letting the bandwidth fluctuate, thus freeing bandwidth for other users that might otherwise be wasted pulling more data than is needed for the current quality level.

As explained above, adaptive streaming systems generally fall into either push-based or pull-based systems. Though certain embodiments of adaptive streaming systems may be employed for the benefit of push-based systems (or a combination of push and pull-based systems), the focus of the present disclosure is on pull-based systems. In pull-based adaptive streaming, clients decide which chunk to request next from a source (e.g., origin server, cache server, etc.). Such a decision may be based on various properties of the content chunk and observations, such as current (observed or available) bandwidth and the amount of data in the client buffer. In current systems, the adaptation may take the form of requesting chunks encoded at different bitrates. For instance, a client may upshift or downshift (e.g., switch to a different bitrate) or stay at the same bitrate to provide continuous playout. The bitrate switching decision is revised based on a predetermined schedule and then a new chunk at the determined bitrate is requested. Various objective functions are possible, and clients may differ in the algorithms used to attempt to maximize the delivered video quality within the available bandwidth constraints. A common trait among traditional systems, however, is the use of the chunk encoding bitrate as a surrogate variable for video quality.

In one embodiment, rather than using an encoder to encode content at various target bitrates, an encoder of the disclosed adaptive streaming systems encodes the content at various quality levels, and then segments (or similarly, fragments) the encoded streams into chunks based on temporal duration whose size in bytes depends on the encoding rate, which in turn corresponds to the required transmission bandwidth on a network. Quality variations according to a predetermined quality window enable constraints on the bitrate variations.

In one embodiment, an encoder (or in some embodiments, another network device such as a server) provides a content matrix organized directly (e.g., explicitly indicated) by quality level. In other words, each representation corresponds to a (single) quality level rather than a nominal or average bitrate. Metadata for each chunk comprises a quality level, and temporal duration and either size of the chunk in bytes or chunk average bitrate (these last two are conjugate variables—one can be computed from the other knowing the temporal duration). In addition, a client device according to certain embodiments of adaptive streaming systems attempts to achieve smooth, non-decreasing quality within given bandwidth constraints by choosing the next chunk based on the current quality level (e.g., corresponding to processing of the current chunk), shifting up when spare bandwidth enables reception of the chunk at a higher quality level faster (e.g., with a defined margin) than the time needed to receive a chunk of that temporal duration. Conversely, the client device downshifts to the best quality it can receive subject to bandwidth constraints when the bandwidth decreases. In steady-state operation, the client device maintains constant quality, allowing the bandwidth to fluctuate naturally within the current quality level.

In some embodiments, such a quality-based adaptive streaming scheme may be embedded into the metadata to enable existing client devices (without modification to software and/or hardware) to send a request (e.g., based on timestamp, bitrate, etc. as conventionally done) and a network device (e.g., a source or cache server) accesses a chunk having the highest quality level satisfying the bitrate requirement communicated by the client device.

Note that by configuring the manifest according to quality level, a provider may easily track the level of quality each client has received for a particular content stream during a given session since a quality metric corresponds to a time average (and possibly weighted) of the plurality of quality levels served to the client. Hence, by providing a more constant quality, viewer experience is improved. Further, tracking the quality received by each user is significantly simpler compared to rate-based adaptive streaming.

These and other embodiments and/or other features are described hereinafter in the context of an example computer network environment, with content embodied as video for the sake of facilitating an understanding of the disclosure. It should be appreciated that other content (e.g., audio, data, graphics, images, etc.), in lieu of or in addition to video, is also considered within the scope of the embodiments. Further, certain embodiments of adaptive streaming systems are described below in the context of adaptive streaming in an environment that uses the Hypertext Transfer Protocol (HTTP). HTTP is a request-response standard for client-server computing. In HTTP, Web browsers act as clients, while an application running on the computer hosting the Web site or content acts as a server. HTTP uses the Transmission Control Protocol (TCP) that is part of the Internet Protocol (IP) suite of communications protocols used for the Internet and other similar networks. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure. It should be understood by one having ordinary skill in the art that, though specifics for one or more embodiments are disclosed herein, such specifics as described are not necessarily part of every embodiment.

FIG. 1 is a schematic diagram of an example environment, a computer network 100, in which certain embodiments of adaptive streaming systems and methods may be implemented. It should be understood by one having ordinary skill in the art, in the context of the present disclosure, that the computer network 100 shown in FIG. 1 is merely illustrative, and should not be construed as implying any limitations upon the scope of the disclosure. The computer network 100 may comprise a plurality of individual networks, such as a wireless network and/or a wired network. The example computer network 100 depicted in FIG. 1 includes a plurality of client devices 102, 104, 105, and 106 (e.g., wired and/or wireless devices, such as cellular phones, personal digital assistants (PDAs), computer devices or systems such as laptops, personal computers, set-top terminals, televisions with communication capabilities, DVD/CD recorders, etc.) that are in communication with one or more server devices, such as an edge or cache server device 108, and/or one or more upstream devices, such as origin server device 114. The origin server device 114 is communicatively coupled to one or more encoding devices, such as encoding or transcoding device 116. Additional servers may be employed in the computer network 100. The cache server device 108 is coupled to an upstream network, such as a wide area network (WAN) 112, which in one embodiment comprises the Internet. In some embodiments, the cache server device 108 may be coupled to the client devices 102, 104, 105, and 106 via a network, such as a local area network (LAN). Other networks are contemplated to be within the scope of the disclosure, including networks that use packets incorporated with other transport protocols or standards. The cache server device 108 and origin server device 114 may also comprise (e.g., be integrated with), or be in local communication with, one or more storage devices.

Communication between the cache server device 108 and the client devices 102, 104, 105, and/or 106 may be via wireless or wired connections, including by way of non-limiting example Ethernet, token ring, private or proprietary networks, among others. The cache server device 108 and/or origin server device 114 may comprise a server in an Internet Service Provider (ISP) facility, a private server, a gateway, and/or other devices or facilities used for communication of streaming video files (among other content, such as data, audio, etc.). One having ordinary skill in the art should understand that additional client devices, cache server devices, upstream server devices, and other devices, such as routers, bridges, etc., may be employed in the computer network 100. Communication of Internet Protocol (IP) packets between the client devices 102, 104, 105, and 106, the cache server device 108, and the origin server device 114 may be implemented according to one or more of a plurality of different protocols, including Transmission Control Protocol (TCP)/IP, among others.

The encoding device 116 is configured with a processor 118, memory 120 configured with encoding logic (executable instructions or code) 122, and a communications (or network) interface (I/O) 126 to receive content streams for encoding and segmenting (also chunking or fragmenting) and send encoded streams in the form of chunks of different quality levels to the origin server 114. In one embodiment, the communications interface 126 receives a digitized content stream (e.g., a movie, a live broadcast of a television show or sports or entertainment event, etc.), and the processor 118 is configured by the encoding logic 122 to encode the content stream at a plurality of encoded representations of different quality levels. For instance, one representation may comprise an encoded version of the received content stream at a quality level (measured in PSNR—Peak Signal-to-Noise Ratio) of 40 decibels (dB), a second representation may comprise an encoded version of the received content stream at a quality level of 35 dB, and a third representation may comprise an encoded version of the received content stream at a quality level of 30 dB. The processor 118 is further configured by the encoding logic 122 to segment each of the plural representations into chunks of different quality levels. Metadata (e.g., location (such as an URL) or identification of each chunk, chunk size, quality level, bitrate, time stamp information, etc.) for all chunks of a given quality level (e.g., 40 dB) are listed in a manifest (MFST) 124 under a respective representation. In other words, each representation corresponds to a different quality level. For instance, metadata for chunks of quality level 40 dB are listed in the manifest under one representation, metadata for chunks of quality level 35 dB are listed under a second representation, and so forth. Each quality level is explicitly indicated (e.g., as opposed to being inferred from bitrate), with the explicit indication corresponding to a quality metric such as decibels, peak signal-to-noise ratio (PSNR), or other well-known quality metrics. The encoding device 116 provides the manifest 124 (or in some embodiments, information used to assemble one elsewhere) and the chunks for the various representations via the communications interface 126 to the origin server device 114.

Although described in the context of encoding software or firmware logic 122 stored in memory 120, it should be understood to one having ordinary skill in the art that the encoding/chunking functionality may be separated among a plurality of modules, or in some embodiments, implemented using hardware or a combination of hardware and software/firmware.

Figure 2:
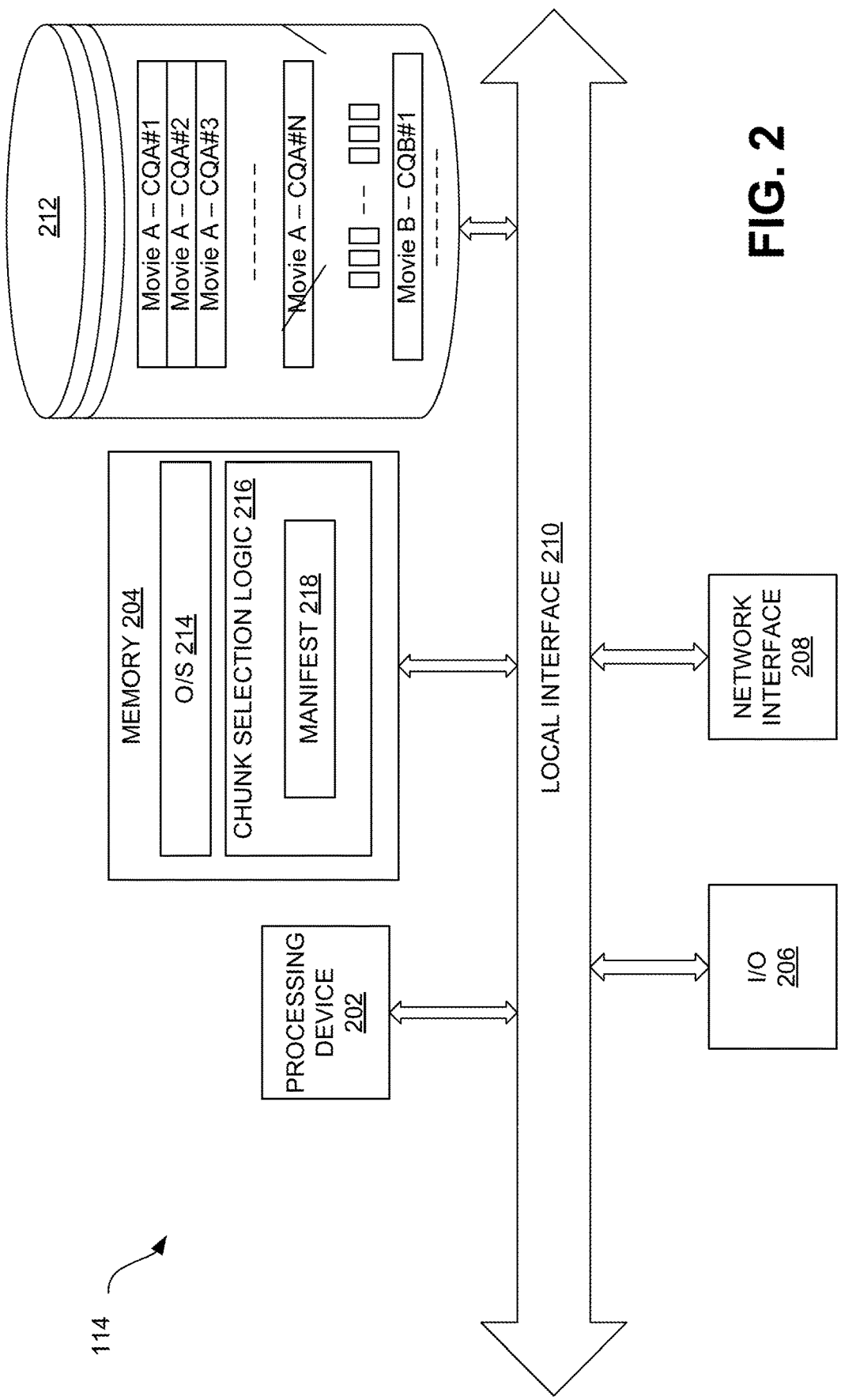
FIG. 2 is a block diagram of an embodiment of an example network device.

FIG. 2 is a block diagram of an embodiment of an example origin server device 114. It should be understood by one having ordinary skill in the art, in the context of the present disclosure, that the origin server device 114 shown in FIG. 2 is merely illustrative, and should not be construed as implying any limitations upon the scope of the disclosure. Generally, in terms of hardware architecture, the origin server device 114 includes a processing device 202, memory 204, input/output (I/O) devices 206, and network interface 208, each of which is communicatively coupled via a local interface 210. The processing device 202 is a hardware device for executing software, particularly that which is stored in memory 204. The processing device 202 may be any custom made or commercially available processor, a central processing unit (CPU), an auxiliary processor among several processors associated with the origin server device 114, a semiconductor-based microprocessor (in the form of a microchip or chip set), a microprocessor, or generally any device for executing software instructions.

The network interface 208 includes one or more devices that communicate both inputs and outputs, for instance, but not limited to, a modulator/demodulator (modem for accessing another device, system, or network), a radio frequency (RF) transceiver or other type of transceiver, a telephonic interface, a bridge, a router, etc.

The I/O devices 206 may include input devices, for example, but not limited to, a keyboard, mouse, scanner, microphone, etc. Furthermore, the I/O devices 206 may also include output devices, for example but not limited to, a printer, display, etc.

The local interface 210 may be, for example but not limited to, one or more buses or other wired or wireless connections, as is known in the art. The local interface 210 may have additional elements, which are omitted for simplicity, such as controllers, buffers (caches), drivers, repeaters, and receivers, to enable communications. Further, the local interface 210 may include address, control, and/or data connections to enable appropriate communications among the aforementioned components.

In one embodiment, the origin server device 114 is further configured with an integrated storage device 212 coupled to the local interface 210, the storage device 212 configured to store a plurality of content chunks received from the encoding device 116. In some embodiments, the storage device 212 may be externally coupled to the origin server device 114.

The memory 204 comprises a suitable operating system (O/S) 214 and chunk selection logic 216. The operating system 214 essentially controls the execution of other computer programs, such as the chunk selection logic 216, and provides scheduling, input-output control, file and data management, memory management, and communication control and related services. The chunk selection logic 216 comprises executable code to respond to client device requests for chunks (e.g., HTTP functionality), as well as a data structure corresponding to a fully or partially (yet continually updated) completed manifest 218 that corresponds to the manifest 124 (or information therein) sent by the encoding device 116. In some implementations, the manifest 218 may not be complete, yet continually assembled and updated from the encoding device 116 (e.g., such as for live broadcasts).

The storage device 212 stores different representations of content in the form of chunks of different quality levels. For instance, using a movie as an example, the storage device 212 stores a first representation of Movie A at a first quality level (e.g., constant quality (CQ) A #1), a second representation of Movie A at a second quality level (e.g., CQA #2), and so on. Each representation is in the form of plural chunks at the given quality level, as partially illustrated by the individual, shorter blocks for representation CQA # N in FIG. 2 (and similarly applicable to the other representations). Each of the chunks is typically independently decodable (e.g., each in the form of closed Groups of Pictures (GOP)), and generally lasts in duration of 2-10 seconds, though not limited to these durations. For each of these different quality level chunks, a corresponding representation with associated metadata for each of the chunks is maintained in the manifest 218 stored in memory 204.

The chunk selection logic 216 is configured to respond to requests from the client devices 102, 104, 105, and/or 106 (and/or to the cache server 108) for the manifest 218, or select portions thereof. These fetch requests may be serviced through either the same, or a different server connection as the one used to fetch content chunks. Using the client device 105 embodied as a set-top box as an example client device hereinafter (with the understanding that similar principles apply to the other client devices), in one embodiment, the client device 105 requests a chunk based on the listing of the manifest 218 fetched from the origin server device 114. The client device 105 is effectively requesting the chunk by quality level, as opposed to bitrate, resulting in a smoother, constant quality viewing experience. In some embodiments, the manifest and referenced chunks are served from the cache server device 108, facilitating rapid response to requests by other client devices in the computer network 100 and/or facilitating trick modes by the requesting client device 105.

In some embodiments, as explained above, the client device 105 (or in some embodiments, a conventional client device) may send a conventional request (without an explicit indication of the quality level, and instead, using bitrate and bandwidth constraints, among other possible parameters), and the chunk selection logic 216 responds to the request by referencing the manifest 218 to ascertain the best quality level subject to the client-communicated bandwidth constraint, and selecting and then sending the corresponding chunk of the determined quality level.

The memory 204 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 204 may incorporate electronic, magnetic, optical, semiconductive, and/or other types of storage media. Note that the memory 204 may have a distributed architecture, where various components are situated remotely from one another, which can be accessed by the processing device 202.

The software in memory 204 may include one or more separate programs, each of which comprises an ordered listing of executable instructions for implementing logical functions. In the embodiment shown in FIG. 2, the software in memory 210 includes the operating system 214 and the chunk selection logic 216, as explained above. Functionality of the chunk selection logic 216 may be implemented using a single module, or distributed among a plurality of modules.

When the chunk selection logic 216 is in operation, the processing device 202 is configured to execute the chunk selection logic 216 stored within the memory 204, to communicate data to and from the memory 204, and to generally control operations of the chunk selection logic 216. The chunk selection logic 216 and the O/S 214, in whole or in part, but typically the latter, are read by the processing device 202, perhaps buffered within the processing device 202, and then executed.

Figure 3:
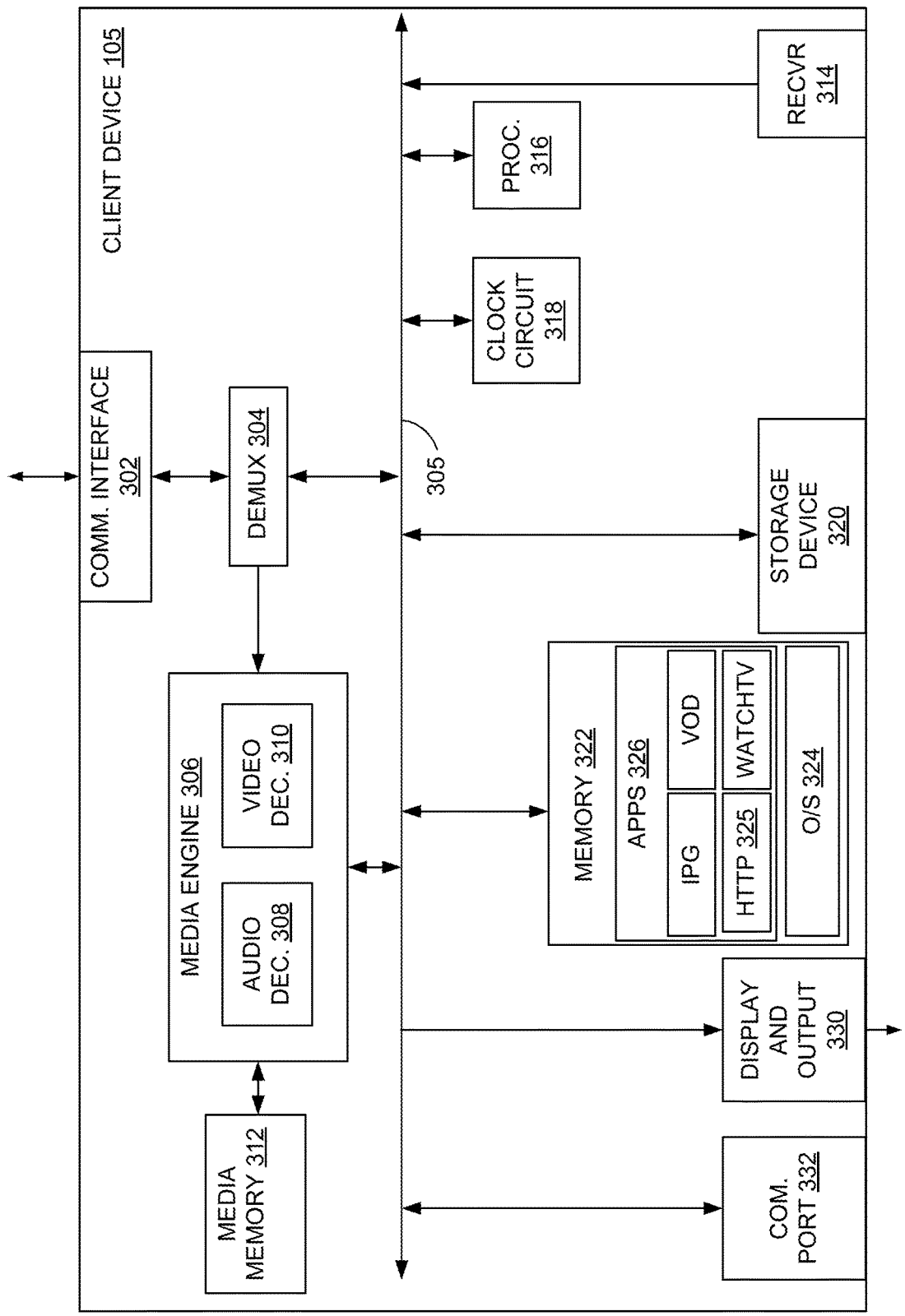
FIG. 3 is a block diagram of an embodiment of an example client device.

FIG. 3 is a block diagram that illustrates an embodiment of an example client device 105. It should be understood by one having ordinary skill in the art, in the context of the present disclosure, that the client device 105 shown in FIG. 3 is merely illustrative, and should not be construed as implying any limitations upon the scope of the disclosure. Similar functionality may be found in the client devices 102, 104, and 106. The client device 105 includes a communication interface 302 suitable for enabling communication (e.g., TCP/IP) with devices of the computer network 100, and for receiving a manifest (or information therein) as well as the requested chunks. For instance, the communication interface 302 may be of a type suitable for communication over an IP network, a coaxial cable network, an HFC network, and/or wireless network, among others. The communication interface 302 is coupled to a demultiplexer (herein, also called demux) 304. The demux 304 is configured to parse the metadata (e.g., in the packet header) of the chunks and the body or payload data (the content, such as the sequence of video and/or audio frames). The metadata may include timestamp information, packet identifiers, program numbers, quality level, and/or other information necessary to decode the received chunk. The chunk and metadata information is forwarded to or otherwise received by the media engine 306 as explained further below.

Although the client device 105 is described in the context of various internet video streaming implementations, such as IPTV and VoD, it should be appreciated by one having ordinary skill in the art that the client device 105 may comprise additional and/or different components in some embodiments. For instance, some embodiments of the client device 105 may include a tuner system (e.g., radio frequency tuning, not shown) coupled to the communication interface 302, the tuner system comprising one or more tuners for receiving transport streams received via the communication interface 302. Further, in some embodiments, a demodulator may be employed, such as to demodulate the received carrier signal, wherein the demux 304 is configured to parse the transport stream packets of one or more defined carrier frequencies.

The demux 304 is coupled to a bus 305 and to a media engine 306 (also known as an audio/video (NV) processing or decoding device). The media engine 306 comprises, in one embodiment, decoding logic comprising one or more of a respective audio decoder 308 and video decoder 310, which decode (e.g., decompress and reconstruct) the chunks received via the communications interface 302. When the chunks are played back, the original content stream is reconstructed in a seamless fashion. The client device 105 dynamically requests and receives the chunk with the proper quality level. The client device 102 can adapt its content consumption rate according to the available receive bandwidth.

The media engine 306 further comprises buffer management functionality to facilitate (e.g., in cooperation with HTTP logic 325) a determination as to the need for downshifting or upshifting to a different quality level to satisfy buffer operation. The media engine 306 is further coupled to the bus 305 and to media memory 312, which in one embodiment comprises one or more buffers for temporarily storing compressed and/or reconstructed pictures and/or audio frames. In some embodiments, the buffers of the media memory 312 and/or other buffers (e.g., network buffers) may reside in other memory (e.g., memory 322, explained below), or distributed among media memory 312 and memory 322.

The client device 105 comprises additional components coupled to bus 305. For instance, the client device 105 further comprises a receiver 314 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), one or more processors (one shown) 316 for controlling operations of the client device 105, and a clock circuit 318 comprising phase and/or frequency locked-loop circuitry (or software, or combination of hardware and software) to lock into system clock information received in an audio, video, or AN stream to facilitate decoding operations and to clock the output of reconstructed audiovisual content.

The client device 105 further comprises, in one embodiment, a storage device 320 (and associated control logic) to temporarily store buffered content and/or to more permanently store recorded content. Memory 322 in the client device 105 comprises volatile and/or non-volatile memory, and is configured to store executable instructions or code associated with an operating system (O/S) 324, and one or more applications 326 (e.g., interactive programming guide (IPG), video-on-demand (VoD), WatchTV (associated with broadcast network TV), HTTP logic 325, among other applications such as pay-per-view, music, personal video recording (PVR), driver software, etc.). The HTTP logic 325 comprises HTTP client functionality, and may generate requests for chunks based in some embodiments on a manifest (e.g., quality level) received from the network 100 (e.g., from the origin server device 114 and/or the cache server device 108), and in some embodiments, to generate requests for chunks by communicating bandwidth constraints and other information that may exclude the explicit quality level. Decisions by the HTTP logic 325 to switch up or down (or maintain) the current quality level may be based on feedback from the media engine 306 (e.g., buffer levels, as explained above) and monitored bandwidth constraints. For instance, the HTTP logic 325 may monitor and hence ascertain that the client device 105 is routinely receiving chunks more slowly than required for continuous playout at the current quality level, which suggests bandwidth constraints for the current quality level (and hence a need to switch down the quality level). The HTTP logic 325 stores the received manifest (or information included therein), and hence is aware of the available quality levels for chunks stored at the origin server device 114. Switching among different representations (e.g., to different quality levels) is thus enabled through the use of the information in the manifest. As noted above, in some embodiments, the explicit quality levels may not be present in the client request (e.g., omitted from the manifest), requiring the origin server device 114 (or cache server device 108) to provide the best quality level subject to the bandwidth or any other constraints communicated by the client device.

Although depicted as software, functionality of the HTTP logic 325 may in some embodiments be configured in hardware, or a combination of hardware and software.

The client device 105 is further configured with the display and output logic 330, as indicated above, which includes graphics and video processing pipelines, among other circuitry, as known in the art to process the decoded pictures and associated audio and provide for presentation (e.g., display) on, or associated with, a display device or other media device. A communications port 332 (or ports) is further included in the client device 105 for receiving information from and transmitting information to other devices. For instance, the communication port 332 may feature USB (Universal Serial Bus), Ethernet, IEEE-1394, serial, and/or parallel ports, etc. In addition, communications port 332 may be configured for home networks (e.g., HPNA/MoCA, etc.). The client device 105 may also include an analog video input port for receiving analog video signals.

One having ordinary skill in the art should understand in the context of the present disclosure that the client device 105 may include other components not shown, including a compression engine, memory, decryptors, samplers, digitizers (e.g., analog-to-digital converters), multiplexers, conditional access processor and/or application software, driver software, Internet browser, among others. Further, though the HTTP logic 325 is illustrated as residing in memory 322, it should be understood that in some embodiments, the HTTP logic 325 may be incorporated in the media engine 306, or elsewhere, such as in the O/S 324, among other locations or in conjunction with other logic of the client device 105. Similarly, in some embodiments, functionality for one or more of the components illustrated in, or described in association with, FIG. 3 may be combined with another component into a single integrated component or device.

Certain embodiments of an adaptive streaming system may encompass all or part of one or a combination of the following: the encoding device 116, the cache server 108, the origin server 114, or one or more client devices 102, 104, 105, and/or 106.

The HTTP logic 325, the media engine 306, the encoding logic 122, and/or the chunk selection logic 216 of certain embodiments of the present disclosure can be implemented in hardware, software, firmware, or a combination thereof. In embodiments where the HTTP logic 325, the media engine 306, the encoding logic 122, and/or the chunk selection logic 216 are implemented in software or firmware (collectively, software code or software logic or simply logic), such embodiments are stored in memory and executed by a suitable instruction execution system. When the HTTP logic 325, the media engine 306, the encoding logic 122, and/or the chunk selection logic 216 are implemented in software, it should be noted that the HTTP logic 325, the media engine 306, the encoding logic 122, and/or the chunk selection logic 216 may be stored on any computer readable medium for use by or in connection with any computer related system or method. In the context of this document, a computer readable medium is an electronic, magnetic, optical, semiconductive, or other physical device or means that can contain or store a computer program for use by or in connection with a computer related system or method. The HTTP logic 325, the media engine 306, the encoding logic 122, and/or the chunk selection logic 216 may be embodied in any non-transitory computer-readable medium for use by or in connection with an instruction execution system, apparatus, or device, such as a computer-based system, processor-containing system, or other system that can fetch the instructions from the instruction execution system, apparatus, or device and execute the instructions.

In embodiments where all or a portion of the functionality of the HTTP logic 325, the media engine 306, the encoding logic 122, and/or the chunk selection logic 216 are implemented in hardware, such functionality of the HTTP logic 325, the media engine 306, the encoding logic 122, and/or the chunk selection logic 216 may be implemented with any or a combination of the following technologies, which are all well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
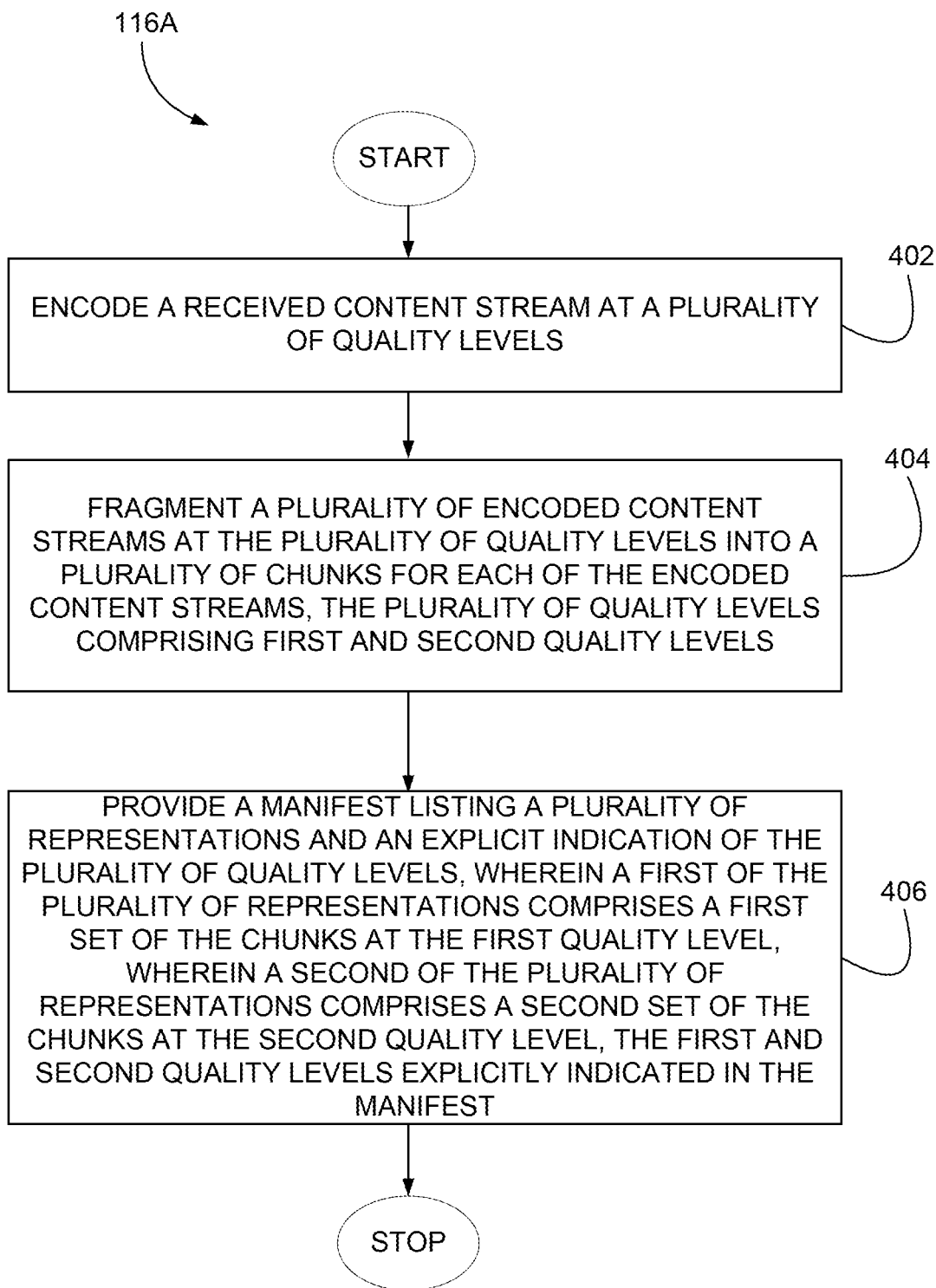
FIG. 4 is a flow diagram that illustrates an embodiment of an example method for generating a plurality of representations of a given content stream and generating a corresponding manifest.

Having described various components of certain embodiments of adaptive streaming systems, it should be appreciated that one method embodiment 116A implemented by the encoding device 116 and illustrated in FIG. 4, comprises encoding a received content stream at a plurality of quality levels (402); fragmenting a plurality of encoded content streams at the plurality of quality levels into a plurality of chunks for each of the encoded content streams, the plurality of quality levels comprising first and second quality levels (404); and providing a manifest listing a plurality of representations and an explicit indication of the plurality of quality levels, wherein a first of the plurality of representations comprises a first set of the chunks at the first quality level, wherein a second of the plurality of representations comprises a second set of the chunks at the second quality level, the first and second quality levels explicitly indicated in the manifest (406).

Figure 5:
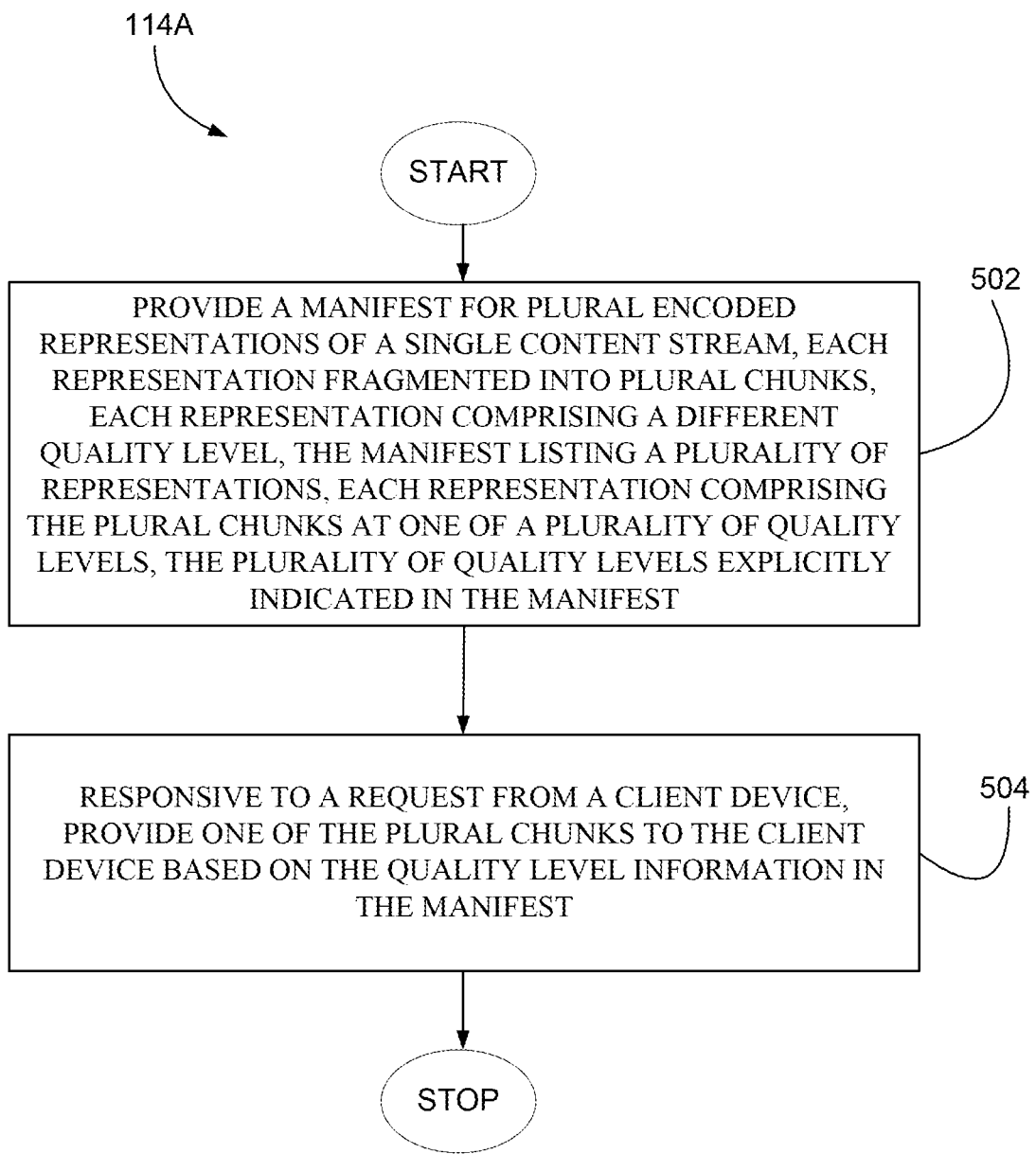
FIG. 5 is a flow diagram that illustrates an embodiment of an example method for providing a manifest with explicit quality indications for chunks corresponding to a plurality of representations of a content stream.

It should be appreciated that another method embodiment 114A implemented by a network device (e.g., the origin server device 114) and illustrated in FIG. 5, comprises providing a manifest for plural encoded representations of a single content stream, each representation fragmented into plural chunks, each representation comprising a different quality level, the manifest listing a plurality of representations, each representation comprising the plural chunks at one of a plurality of quality levels, the plurality of quality levels explicitly indicated in the manifest (502); and responsive to a request from a client device, providing one of the plural chunks to the client device based on the quality level information in the manifest (504).

Figure 6:
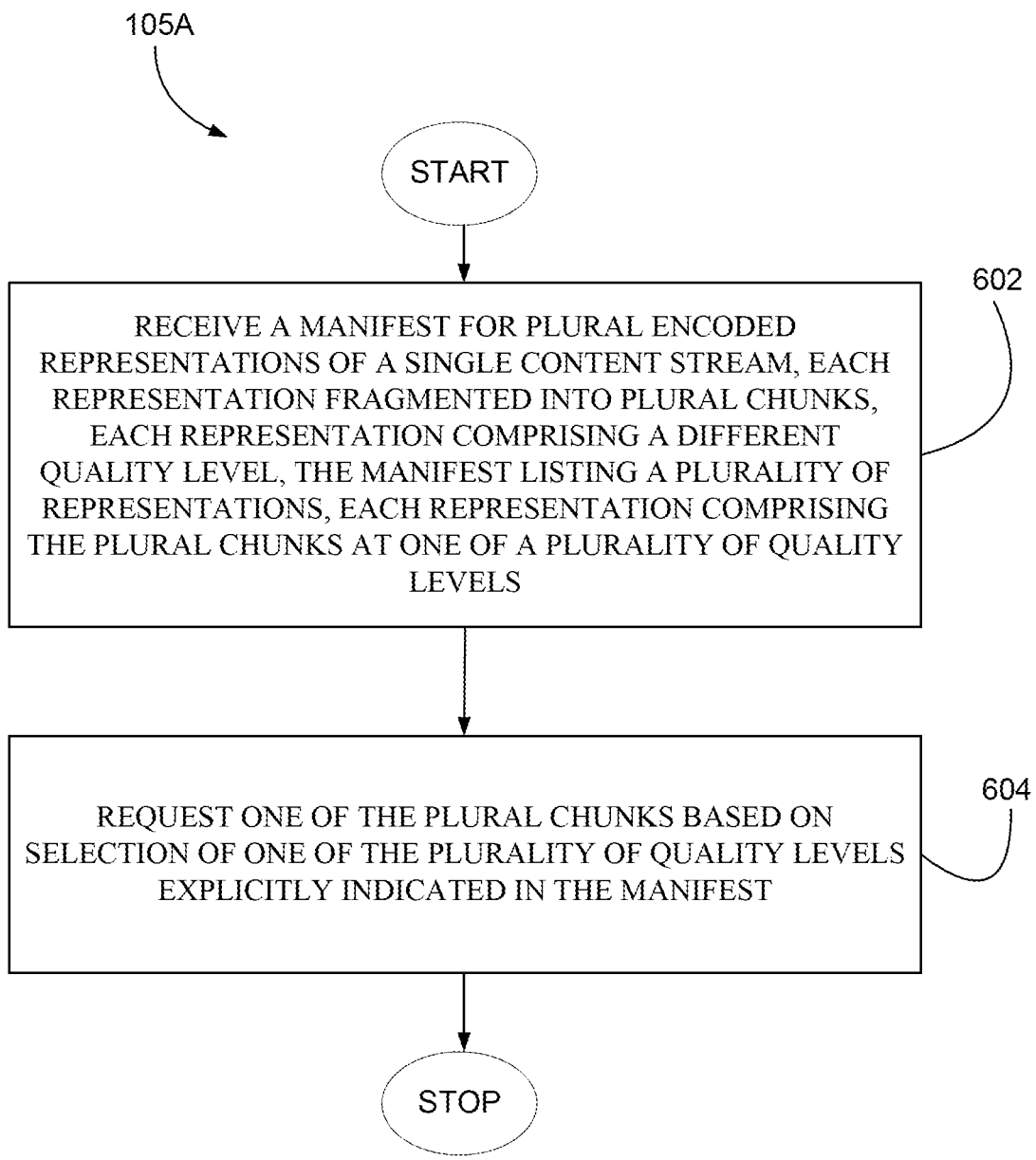
FIG. 6 is a flow diagram that illustrates an embodiment of an example method for receiving a manifest with explicit quality indications and chunks of a given quality level.

It should be appreciated that another method embodiment 105A implemented by a client device (e.g., the client device 105) and illustrated in FIG. 6, receiving a manifest for plural encoded representations of a single content stream, each representation fragmented into plural chunks, each representation comprising a different quality level, the manifest listing a plurality of representations, each representation comprising the plural chunks at one of a plurality of quality levels (602); and requesting one of the plural chunks based on selection of one of the plurality of quality levels explicitly indicated in the manifest (604).

Any process descriptions or blocks in flow charts should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIGS. 4-6 using separate boxes can be combined.

In addition, though the various flow diagrams (e.g., shown in FIGS. 4-6) are shown and described in the context of the architectures shown and described in FIGS. 1-3, it should be understood that implementation of the methods described in FIGS. 4-6 are not limited to those architectures, and that the same devices or other processing devices possessing different architectures configured to implement such methods are contemplated to be within the scope of the disclosure.

It should be emphasized that the above-described embodiments of the present disclosure are merely possible examples of implementations, merely set forth for a clear understanding of the principles of the adaptive streaming systems and methods. Many variations and modifications may be made to the above-described embodiment(s) without departing substantially from the spirit and principles of the disclosure. These and other modifications and variations are intended to be included herein within the scope of this disclosure and protected by the following claims.

We claim:

1. An apparatus comprising:
a memory storage; and
a processing unit coupled to the memory storage, wherein the processing unit is operative to:
receive a manifest for plural encoded representations of a single content stream, each representation fragmented into plural chunks of varying size, each representation comprising time stamp information and a different quality level represented in Peak Signal-To-Noise decibels, the manifest listing a plurality of representations, each representation comprising the plural chunks at one of a plurality of quality levels;
determine bandwidth constraints of the apparatus;
request one of the plural chunks based on selection of one of the plurality of quality levels explicitly indicated in the manifest based on the determined bandwidth constraints;
receive the requested one of the plural chunks;
play the received one of the plural chunks;
determine a change in the bandwidth constraints of the apparatus; and
request another of the plural chunks based on the change in the bandwidth constraints of the apparatus and the plurality of quality levels explicitly indicated in the manifest.

2. The apparatus of claim 1, wherein the processing unit is further operative to determine whether to shift up in quality level, shift down in quality level, or maintain the current quality level based on at least one of the following: buffer conditions and other network, and device-specific requirements and observations.

3. The apparatus of claim 2, wherein the processing unit is further operative to shift up and request a chunk of a higher quality level when available bandwidth can sustain the average bitrate prescribed by the higher quality level for a predetermined period of time.

4. The apparatus of claim 3, wherein the processing unit is further operative to maintain the current quality level and request a chunk from the same representation as the currently processed chunk when available bandwidth can sustain the average bitrate prescribed by the current quality level for a predetermined period of time regardless of temporary increases or decreases in bandwidth availability.

5. The apparatus of claim 2, wherein the processing unit is further operative to shift down and request a chunk of a lower quality level when available bandwidth can no longer sustain the average bitrate prescribed by the current quality level for a predetermined period of time.

6. The apparatus of claim 1, wherein the single content stream comprises audio.

7. The apparatus of claim 1, wherein the single content stream comprises video.

8. A method comprising:
receiving, by a client device, a manifest for plural encoded representations of a single content stream, each representation fragmented into plural chunks of varying size, each representation comprising time stamp information and a different quality level represented in Peak Signal-To-Noise decibels, the manifest listing a plurality of representations, each representation comprising the plural chunks at one of a plurality of quality levels;
determining bandwidth constraints of the client device;
requesting one of the plural chunks based on selection of one of the plurality of quality levels explicitly indicated in the manifest and the determined bandwidth constraints of the client device;
receiving the requested one of the plural chunks;
playing the received one of the plural chunks;
determine a change in the bandwidth constraints of the client device; and
requesting another of the plural chunks based on the change in the bandwidth constraints of the client device and the plurality of quality levels explicitly indicated in the manifest.

9. The method of claim 8, further comprising determining whether to shift up in quality level, shift down in quality level, or maintain the current quality level based on at least one of the following: buffer conditions and other network, and device-specific requirements and observations.

10. The method of claim 9, further comprising shifting up and requesting a chunk of a higher quality level when available bandwidth can sustain the average bitrate prescribed by the higher quality level for a predetermined period of time.

11. The method of claim 10, further comprising maintaining the current quality level and requesting a chunk from the same representation as the currently processed chunk when available bandwidth can sustain the average bitrate prescribed by the current quality level for a predetermined period of time regardless of temporary increases or decreases in bandwidth availability.

12. The method of claim 9, further comprising shifting down and requesting a chunk of a lower quality level when available bandwidth can no longer sustain the average bitrate prescribed by the current quality level for a predetermined period of time.

13. The method of claim 8, wherein receiving the manifest for plural encoded representations of the single content stream comprises receiving the manifest for plural encoded representations of the single content stream wherein the single content stream comprises audio.

14. The method of claim 8, wherein receiving the manifest for plural encoded representations of the single content stream comprises receiving the manifest for plural encoded representations of the single content stream wherein the single content stream comprises video.

15. A non-transitory computer-readable medium that stores a set of instructions which when executed perform a method comprising:
receiving, by a client device, a manifest for plural encoded representations of a single content stream, each representation fragmented into plural chunks of varying size, each representation comprising time stamp information and a different quality level represented in Peak Signal-To-Noise decibels, the manifest listing a plurality of representations, each representation comprising the plural chunks at one of a plurality of quality levels;
determining bandwidth constraints of the client device;
requesting one of the plural chunks based on selection of one of the plurality of quality levels explicitly indicated in the manifest and the determined bandwidth constraints of the client device;
receiving the requested one of the plural chunks;
playing the received one of the plural chunks;
determine a change in the bandwidth constraints of the client device; and
requesting another of the plural chunks based on the change in the bandwidth constraints of the client device and the plurality of quality levels explicitly indicated in the manifest.

16. The non-transitory computer-readable medium of claim 15, further comprising determining whether to shift up in quality level, shift down in quality level, or maintain the current quality level based on at least one of the following: buffer conditions and other network, and device-specific requirements and observations.

17. The non-transitory computer-readable medium of claim 16, further comprising shifting up and requesting a chunk of a higher quality level when available bandwidth can sustain the average bitrate prescribed by the higher quality level for a predetermined period of time.

18. The non-transitory computer-readable medium of claim 17, further comprising maintaining the current quality level and requesting a chunk from the same representation as the currently processed chunk when available bandwidth can sustain the average bitrate prescribed by the current quality level for a predetermined period of time regardless of temporary increases or decreases in bandwidth availability.

19. The non-transitory computer-readable medium of claim 15, further comprising shifting down and requesting a chunk of a lower quality level when available bandwidth can no longer sustain the average bitrate prescribed by the current quality level for a predetermined period of time.

20. The non-transitory computer-readable medium of claim 15, wherein receiving the manifest for plural encoded representations of the single content stream comprises receiving the manifest for plural encoded representations of the single content stream wherein the single content stream comprises audio.

* * * * *